United States Patent [19]
Smith et al.

[11] 3,850,726
[45] Nov. 26, 1974

[54] VINYLIDENE CHLORIDE COPOLYMER

[75] Inventors: David R. Smith; Howard Peterson, both of Decatur, Ill.

[73] Assignee: A. E. Staley Manufacturing Company, Decatur, Ill.

[22] Filed: July 10, 1972

[21] Appl. No.: 270,417

Related U.S. Application Data

[60] Continuation-in-part of Ser. No. 819,956, April 28, 1969, abandoned, Division of Ser. No. 868,209, Oct. 21, 1969, Pat. No. 3,714,106.

[52] U.S. Cl. ......... 156/306, 117/132, 117/138.8 A, 117/138.8 E, 117/161 UZ, 117/161 UT, 117/161 UF, 156/333
[51] Int. Cl. ........................... C09j 7/02, B44d 1/02
[58] Field of Search 117/138.8 E, 161 UT, 161 UZ, 117/155 UA, 132 C; 260/29.65 Q; 156/306–333

[56] References Cited
UNITED STATES PATENTS

| | | | |
|---|---|---|---|
| 2,914,499 | 11/1959 | Sheetz | 260/29.65 Q |
| 3,272,785 | 9/1966 | Lewis et al | 260/80.75 |
| 3,353,991 | 11/1967 | Shelburg et al | 117/138.8 |
| 3,353,992 | 11/1967 | Grenly et al | 117/138.8 |
| 3,366,590 | 1/1968 | Taft | 260/29.6 |
| 3,423,232 | 1/1969 | Reinhard et al | 117/76 |
| 3,449,302 | 6/1969 | Nachbur et al | 260/79.3 |
| 3,617,368 | 11/1971 | Gibbs et al | 117/161 UT |

*Primary Examiner*—Leon D. Rosdol
*Assistant Examiner*—P. E. Willis
*Attorney, Agent, or Firm*—M. Paul Hendrickson; Charles J. Meyerson

[57] ABSTRACT

A polyvinylidene chloride latex composition suitable for coating substrates comprising a copolymer of (A) 70 to 95 percent by weight vinylidene chloride, (B) 0.5 to 30 percent by weight hydroxyalkyl ester of an alpha, betaethylenically unsaturated carboxylic acid, (C) 0 to 3 percent by weight ethylenically unsaturated sulfur acid having sulfur in valence state 6, (D) 0 to 5 percent by weight ethylenically unsaturated carboxylic acid and (E) 0 to 29.5 percent by weight ethylenically unsaturated monomer other than (A), (B), (C) or (D).

11 Claims, No Drawings

3,850,726

VINYLIDENE CHLORIDE COPOLYMER

DISCLOSURE OF THE INVENTION

This application is a continuation-in-part of application Ser. No. 819,956, filed Apr. 28, 1969, now abandoned, and a division of application Ser. No. 868,209, filed Oct. 21, 1969, now Pat. No. 3,714,106.

This invention relates to a polyvinylidene chloride latex suitable for coating substrates comprising a copolymer of vinylidene chloride and hydroxyalkyl ester of an alpha, beta-ethylenically unsaturated carboxylic acid.

Polyvinylidene chloride polymers have been found suitable for coating paper, metals, plastics, etc. since these polymers form protective coatings which are tough, inert to a large number of chemicals, such as water, acids, oils and fats, and relatively impermeable to many gases. In general, it is preferred to apply the polyvinylidene chloride to the substrate in the form of a latex rather than from an organic solvent solution. In this way, one can avoid the use of expensive organic solvents, which are frequently inflammable or toxic.

It is generally considered that a polyvinylidene chloride latex should be applicable to a substrate at high total solids in order to minimize the amount of water that has to be removed from the substrate and the drying time. See for example, British Pat. No. 1,007,050, British Pat. No. 1,011,500, U.S. Pat. No. 2,894,927, etc. Inasmuch as most high speed coating operations require the use of low viscosity coating compositions, the polyvinylidene chloride latex should have a relatively low viscosity under the indicated conditions. This brings into play a number of interdependent factors, which require that the polyvinylidene chloride latex be prepared under carefully controlled conditions. As the polyvinylidene chloride polymer solids increase, the viscosity of the latex tends to increase and the stability of the latex decreases (i.e., the tendency for the latex to coagulate increases). The emulsion stability can be improved by increasing the concentration of emulsifier, particularly ionic emulsifier, used to prepare the latex polymer. However, the higher the concentration of emulsifier used to prepare the polyvinylidene chloride latex, the higher the concentration of polyvinylidene chloride particles in the emulsion and the smaller the particle size. See Canadian Pat. No. 723,207. At high solids, the viscosity of a polyvinylidene chloride latex increases as the number of polymer particles increases and/or as their size decreases. Further, as the emulsifier concentration increases, the water resistance and moisture vapor transmission resistance of the deposited latex film decreases.

It is also generally considered that a polyvinylidene chloride latex should have a relatively small particle size, less than about 0.3 micron, preferably no more than about 0.2 micron, in order to coalesce properly when deposited on a substrate. In order to keep polyvinylidene latex from forming a hazy coating, the aforementioned British patents indicate that it is desirable to employ polyvinylidene chloride latex having a wider particle size distribution than that which can be obtained by the polymerization process described in the 1,011,500 patent. These patentees state that the polymerization process described in the 1,011,500 patent produces only emulsions having a particle size range of about 0.04 micron and that this drawback is overcome by blending two batches of polyvinylidene chloride latex, each with a different size. We believe that a polydisperse system of this type levels better and coalesces more readily when applied to a substrate.

During the last two decades polyethylene packaging films have met with great commercial success. These films are tough, semi-transparent, heat-sealable, resistant to many chemicals, inexpensive and exhibit a high degree of moisture vapor impermeability. More recently, polypropylene films have been used for substantially the same purpose for their high tensile strength albeit higher heat-sealing temperature. However, these polyolefin films are extremely permeable to the passage of greases (fats and oils). A greasy aesthetically undesirable texture is imparted to polyolefin packages which detracts from the marketability of the package when polyolefin film is used to package meats, nut meats, potato chips and other materials which are greasy or tend to exude a greasy substance. Further, the oxygen permeability of polyolefin films, particularly polyethylene, is often undesirable since it decreases the storage life of perishable goods.

Polyvinylidene chloride latexes have been suggested for use in coating various substrates in order to impart grease-resistance and oxygenimpermeability. However, polyvinylidene chloride latexes tend not to wet synthetic polymer films, particularly polyethylene and polypropylene, adequately and coatings deposited therefrom suffer from discontinuities and poor adhesion and are generally unsatisfactory for commercial use. According to accepted wetting principles, polyvinylidene chloride latex having a surface tension under about 29 dynes/cm. is capable of wetting untreated polypropylene and under about 43 dynes/cm. wet corona discharge treated polypropylene. To a large extent the maximum permissible surface tension for coating corona discharge treated polypropylene is dependent on the age and treatment of the polypropylene. In some cases, corona discharge treatment does not appreciably improve the wetting characteristics of the polypropylene and polyvinylidene chloride latex having a surface tension below 43 dynes/cm. must be used to wet the corona discharge treated polypropylene. Although surface active agents improve wetting by reducing surface tension, the anionic emulsifiers used to prepare polyvinylidene latexes seem to act as release agents reducing the adhesion of the deposited film. Poor adhesion may be minimized to some extent by priming the substrates with a subbing layer of some material that improves the adhesion of the substrate to the polyvinylidene chloride film deposited from aqueous emulsion. However, when a priming step is included, the apparent economic and technical advantages from coating aqueous emulsions are reduced or eliminated altogether. For most uses, a heat-sealed, polyvinylidene chloridepolyolefin laminate should have a dynamic peel strength of at least 75 g/inch (preferably 100 g/inch) under ambient conditions and after aging at 100 percent relative humidity (R.H.) for 16 hours.

British Pat. Nos. 1,007,050 and 1,011,500 disclose coating substrates including unprimed polyethylene and polypropylene with polyvinylidene chloride latexes prepared by an emulsifier-free polymerization process. However, these polyvinylidene chloride latexes have reduced stability. For example, the patentee in British Specification 1,011,500 indicates that emulsifier-free latexes at high solids are unstable and have limited shelf life due to the sedimentation of relatively large copolymer particles. British Pat. No. 1,011,500 states that small particle size (less than about 0.3 micron, preferably no more than about 0.2 micron) polyvinylidene chloride polymers of predetermined monomer content suitable for coating various unprimed substrates can be prepared with a particular redox catalyst system. The coating composition must contain less than 0.1 percent by weight ionic (anionic or cationic) emulsifier and less than 2 percent by weight nonionic emulsifier. Preferably, the polymerization is performed in the absence of all emulsifiers. The patentee states that emulsifiers reduce the storage stability of the latex and that nonionics tend to cause excessive coagulum during polymerization. Since up to 2 percent by weight nonionic surface active agent improves the wetting properties of the latex, the patentee recommends adding nonionic emulsifier to the latex just prior to the coating operation. If more than 0.1 percent by weight of an ionic (anionic or cationic) emulsifier is used to prepare the polyvinylidene chloride latex, the adhesion of the coating to the substrate is impaired, i.e., the anionic surface active agent seems to act as a release agent.

In our copending application Ser. No. 819,957, filed Apr. 28, 1969, we have disclosed polyvinylidene chloride latexes comprising a copolymer of (A) 70 to 95 percent by weight vinylidene chloride, (B) 0.1 to 3 percent by weight ethylenically unsaturated sulfur acid having sulfur in valence state 6, (C) 0 to 5 percent by weight ethylenically unsaturated carboxylic acid and (D) 2 to 29.9 percent by weight ethylenically unsaturated monomer other than (A), (B) or (C) which have excellent stability at high total solids and deposit films having excellent adhesion to unprimed polyolefin substrates. As pointed out therein, the ethylenically unsaturated sulfur acid having sulfur in valence state 6, functions in the same manner as conventional non-polymerizable anionic emulsifiers during polymerization promoting the formation of small particle size, stable, high-solids polyvinylidene chloride latexes. However, whereas the conventional non-polymerizable anionic emulsifiers, which seem to migrate to the interface between the polyolefin substrate and deposited film, act as release agents, the sulfur acid moieties in the polyvinylidene polymer seem to bond the deposited film to the polyolefin substrate. As pointed out therein, the surface tension of latexes for coating unprimed polyolefins is preferably reduced by adding nonionic surface active agents and/or volatile alcohols, such as butanol, to improve wetting. However, as the emulsifier concentration increases, the water resistance and moisture vapor transmission resistance of the deposited latex film decreases. On the other hand, butanol, the most efficient volatile alcoholic wetting agent, has an obnoxious odor.

The general object of this invention is to provide polyvinylidene chloride latexes containing an internal wetting agent. A more specific object of this invention is to provide stable, polyvinylidene chloride latexes containing an internal wetting agent, wherein said polyvinylidene chloride latexes have excellent adhesion to substrates, such as unprimed polyethylene and polypropylene. Other objects will appear hereinafter.

We have now found that hydroxyalkyl esters of alpha, betaethylenically unsaturated carboxylic acids act as internal wetting agents in polyvinylidene chloride latexes. In some cases, the hydroxyalkyl ester moiety reduces the surface tension of the polyvinylidene chloride latex in a manner similar to conventional wetting agents. In other cases, the polyvinylidene chloride latexes of this invention wet substrates, which they should not be capable of wetting according to conventional wetting theories. For example, polyvinylidene chloride latexes of this invention, having a surface tension of 50 to 60 dynes/cm., wet corona discharge treated polypropylene. As indicated above, corona discharge treated polypropylene normally is wet by polyvinylidene chloride latexes having a surface tension under about 43 dynes/cm. The hydroxyalkyl esters of alpha, beta-ethylenically unsaturated carboxylic acids can be used in a concentration of about 0.5 to 30 percent by weight of the copolymer with 0.5 to 18.0 percent yielding the best results. The optimum concentration of hydroxyalkyl ester is dependent upon the wetting characteristics of the polypropylene. If the surface can be wetted with a solution having a surface tension of 43 dynes/cm., 0.5 to 5.0 percent by weight hydroxyalkyl ester can be used. If the surface can be wetted with a solution having a surface tension of about 29 dynes/cm., a higher concentration of hydroxyalkyl ester is preferred.

Suitable hydroxyalkyl esters of alpha, beta-ethylenically unsaturated carboxylic acids include hydroxyethyl acrylate, 2-hydroxypropyl acrylate, 4-hydroxybutyl-1-acrylate, hydroxyethyl methacrylate, 2,3-dihydroxypropyl methacrylate, di(hydroxyethyl) itaconate, ethyl hydroxyethyl maleate, di(2,3-dihydroxypropyl) fumarate, hydroxyethyl crotonate, hydroxyethoxyethyl methacrylate, etc. The above compounds are representative of hydroxyalkyl esters containing from 2 to 4 carbon atoms in the alkyl group.

The polyvinylidene chloride polymers of this invention are copolymers of from about 70 to 95 percent by weight vinylidene chloride, preferably 80 to 94 percent by weight vinylidene chloride. The minimum and maximum concentrations of vinylidene chloride in the copolymer depend upon the ultimate use of the copolymer latex and the comonomers used to prepare it. If less than about 5 percent by weight comonomer is present, the polymer tends to crystallize prematurely. (Preferably at least about 6 percent by weight comonomer should be present.) However, as the concentration of vinylidene chloride in the polymer decreases, the barrier resistance of the applied coating decreases. Accordingly, the comonomers should comprise from about 5 to 30 percent by weight of the polymer, and preferably 6 to 20 percent by weight, to obtain the proper balance.

Although the polyvinylidene chloride latexes of this invention can be composed of only hydroxyalkyl ester of alpha, beta-ethylenically unsaturated carboxylic acid and vinylidene chloride comonomer, it is preferable to employ other monomers as plasticizers, internal emulsifiers and to prevent premature crystallization of the polymer prior to application.

The polyvinylidene chloride latexes of this invention can contain a copolymerizable ethylenically unsaturated sulfur acid having sulfur in valence state 6 in a concentration of about 0 to 3 percent by weight of the copolymer, preferably 0.3 to 1.5 percent by weight, when the latex is to be used for coating unprimed polyolefins. This monomer is necessary in order to form stable small particle size, high solids polyvinylidene chloride latexes having suitable adhesion to unprimed polyolefin substrates, but is not necessary for latexes to be applied to nylon, polyester, metal, glassine or paper substrates. The ethylenically unsaturated sulfur acid functions in the same manner as conventional non-polymerizable anionic emulsifiers during polymerization promoting the formation of small particle size, stable, high solids polyvinylidene chloride latexes. However, whereas the conventional non-polymerizable anionic emulsifiers, which seem to migrate to the interface between the polyolefin substrate and deposited film, act as release agents, the sulfur acid moieties in the polyvinylidene polymer seem to bond the deposited film to the polyolefin substrate. Other things being equal, as the concentration of ethylenically unsaturated sulfur acid increases, the particle size of the polymer latex decreases.

Suitable copolymerizable ethylenically unsaturated sulfur acids having sulfur in valence state 6 include any of the sulfoalkyl esters of alpha, beta-ethylenically unsaturated acids described in U.S. Pat. Nos. 3,147,301, 3,033,833, 2,914,499, 2,923,734 and 3,024,221, such as sulfoethyl acrylate, sodio sulfoethyl methacrylate, 3-sulfo-2-hydroxypropyl-methacrylate, di(sulfoethyl) itaconate, ethyl sulfoethyl maleate, di(sulfoethyl) fumarate, etc.; bisulfate esters of hydroxyalkyl esters of alpha, beta-ethylenically unsaturated acids, such as bisulfate ester of ethylene glycol monomethacrylate, bisulfate ester of triethylene glycol monoacrylate, etc.

The copolymer of this invention can contain from 0 to 5 percent by weight copolymerizable ethylenically unsaturated carboxylic acid. This monomer enhances the stability of the latex, improves leveling and wetting of the substrate and aids in adhesion of the latex polymer to metal substrates. When hydroxyalkyl ester is used in a concentration of about 0.5 to 5 percent by weight, the ethylenically unsaturated carboxylic acid is preferably used in a concentration of about 0.2 percent by weight. When more than 5 percent by weight hydroxyalkyl ester is employed, the ethylenically unsaturated acid can be omitted completely. Suitable ethylenically unsaturated carboxylic acids include acrylic acid, methacrylic acid, itaconic acid, monobutyl itaconate, itaconic anhydride, etc.

The copolymer can contain from 0 to 29.5 percent by weight of copolymerizable ethylenically unsaturated monomer containing no free acid groups or hydroxyalkyl moieties. The copolymerizable ethylenically unsaturated monomer containing no free acid groups or hydroxyalkyl moieties and the other monomers together are necessary in order to prevent premature crystallization of the polymer prior to application and in order to impart the necessary flexibility and heat-sealing properties to the dried coating. The hydroxyalkyl ester monomer and ethylenically unsaturated monomer containing no free acid groups or hydroxyalkyl moieties must comprise at least 2 percent by weight of the polymer in order to prevent premature crystallization. (Preferably at least about 4 percent by weight of these comonomers should be present.)

Suitable monoethylenically unsaturated comonomers containing no free acid or hydroxyalkyl groups suitable for use in this invention include alkyl esters of alpha, beta-ethylenically unsaturated monocarboxylic acids containing from 1 to 18 carbon atoms in the alkyl group, such as methyl acrylate, ethyl acrylate, butyl acrylate, 2-ethyl hexyl acrylate, ethoxyethyl acrylate, methyl methacrylate, ethyl alpha-cyanoacrylate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, acrylamide, etc.; monovinyl aromatics, such as styrene, vinyltoluene, etc.; vinyl halides, such as vinyl chloride, vinyl bromide, etc.; diesters of alpha, beta-ethylenically unsaturated dicarboxylic acids, such as dimethyl itaconate, diethyl fumarate, dimethyl maleate, etc.; alkyl vinyl ethers, such as methyl vinyl ether, ethyl vinyl ether, etc.; alkyl vinyl ketones, such as methyl vinyl ketone, etc. If desired, up to about 2 percent by weight of the monomers used to prepare the polyvinylidene chloride latexes of this invention can be copolymerizable diethylenically unsaturated comonomers, such as allyl crotonate, allyl acrylate, polyhydric alcohol esters of alpha, beta-ethylenically monocarboxylic acids, such as 1,3-butylene dimethacrylate, the diacrylate or dimethacrylate of glycol, diethylene glycol, triethylene glycol, etc.

Accordingly, polyvinylidene chloride latexes of this invention comprise a copolymer of (A) 70 to 95 percent by weight vinylidene chloride, (B) 0.5 to 30 percent by weight hydroxyalkyl ester of alpha, beta-ethylenically unsaturated carboxylic acid, preferably 0.5 to 18 percent by weight, (C) 0 to 3 percent by weight ethylenically unsaturated sulfur acid having sulfur in valence state 6, (D) 0 to 5 percent by weight ethylenically unsaturated carboxylic acid and (E) 0 to 29.5 percent by weight ethylenically unsaturated monomer other than (A), (B), or (C). For coating unprimed polyolefins, (C) is from 0.1 to 3 percent by weight and (E) is from 0 to 29.4 percent by weight.

Briefly, the polyvinylidene chloride latexes of this invention are prepared by forming an aqueous emulsion, adding the monomers to be polymerized and catalysts to the emulsion, followed by polymerizing said monomers.

The dispersing agents or emulsifiers for use in this invention are the so-called anionic and nonionic surface active agents. The anionic surface active agents are preferred for the preparation of latexes to be used for coating substrates other than unprimed polyolefins since they tend to yield the desired particle size polymers at lower emulsifier concentrations than can be obtained with the nonionic surface active agents. Suitable anionic surface active agents include alkali metal salts of alkyl aryl sulfonates, such as sodium dodecyl benzene sulfonate, sodium diamyl naphthalene sulfonate, disodium 4-dodecyloxydi(benzene sulfonate), etc.; alkali metal salts of alkyl sulfates, such as sodium lauryl sulfate, sodium myristyl sulfate, etc. Suitable nonionic surface active agents include the alkylaryl polyoxyethylene glycols and alkylpolyoxyethylene glycols containing from 4 to 18 carbon atoms in the alkyl group and from about 2 to 120 oxyethylene units. These anionic and monionic surface active agents can be used in a weight concentration of about 0.1 to 6 percent of the total monomer weight. The most advantageous concentration will depend, as in all emulsion polymerizations, in part on the emulsifier or emulsifiers used, the monomers to be polymerized, the desired particle size, the initiator system, etc.

When the polymer latexes of this invention are to be used for coating unprimed polyolefins, the conventional non-polymerizable anionic surface active agent can be used in a concentration up to about 0.6 part by weight per 100 parts by weight of the polymerizable monomers, preferably in the range of 0.001 to 0.1 part by weight of the polymerizable monomers, in order to help yield the desired particle size polymers. In these systems, the ethylenically unsaturated sulfur acid functions as the principle anionic emulsifier. Within the preferred range of 0.001 to 0.1 part by weight anionic non-polymerizable emulsifier, the polyvinylidene chloride latex of this invention has excellent adhesion to unprimed polyolefin film under both high humidity and low humidity conditions. As the concentration of anionic emulsifier increases from about 0.1 to 0.6 part by weight, the adhesion to unprimed polyethylene and polypropylene film under high humidity aging conditions decreases markedly. However, under ambient conditions, the adhesion is still good at about 0.6 part per 100 parts by weight monomer. For this use, the nonionic emulsifiers can be used in a concentration up to about 3 percent of the total monomer weight, preferably from 0.2 to 1.5 percent, in order to help yield the desired particle size polymers. However, best results have been obtained for coating unprimed polyolefins where the total concentration of non-polymerizable anionic emulsifier and nonionic emulsifier is less than about 1.6 percent by weight of the total monomer concentration.

As polymerization catalysts, there may be used one or more of the peroxidic compounds known to act as free-radical catalysts. The catalyst can be soluble in aqueous solutions of the emulsifier or soluble only in the monomer phase, or both. Among the useful catalysts for the present type of copolymerization are inorganic peroxides, organic peroxides and hydroperoxides. These include hydrogen peroxide, benzoyl peroxide, tertiary butyl hydroperoxide, diisopropyl benzene hydroperoxide, cumene hydroperoxide, caproyl peroxide, methyl ethyl ketone peroxide, etc. Other freeradical catalysts are also useful, such as azodiisobutyronitrile and other aliphatic azo compounds of the type having an acylic azo group and an aliphatic carbon atom or each nitrogen, at least one of which is tertiary. In part, the particular combination of monomers governs the selection of the catalysts since some monomers respond better to one variety than they do to another.

The amount of peroxidic catalysts required is about proportional to the concentration of monomers used. The usual range is 0.01 to 3 percent of catalysts with reference to the weight of the monomer mixture. The preferred range is about 0.10 to 1.0 percent while the range of 0.1–0.4 percent is usually best. The optimum amount of catalysts is determined in large part by the nature of the particular monomers selected, including impurities which accompany particular monomers. In general, it is preferred to use the lowest concentration of catalyst sufficient to give the desired rate of conversion since the higher the catalyst concentration, the lower the polymer's molecular weight and the poorer its barrier properties.

Frequently, a promoter for the catalysts is used to hasten the reaction at a sufficiently low temperature to avoid coagulation. The promoter may be a reducing agent and the combination with the peroxidic catalyst is frequently referred to as a "redox system." Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, in small concentrations, particularly ferrous ion in the form of ferrous ammonium sulfate at concentrations of a few parts of ferrous ion per million.

The amount of promoter required varies, as is known, with the free-radical initiator chosen and with the particular promoter. The emulsifying agent also affects somewhat the amount of catalyst used as does the particular monomers. At the outside, not more than 3 percent or less than 0.01 percent of promoter is used in these situations. The preferred range of ascorbic acid is at the low end of this range up to about 0.1 percent while sulfites are used preferably in an amount of 0.1 to 1 percent.

Polymerization is best effected below about 95°C. Preferred range is about 30° to 70°C. with the bottom portion of the range (30° to 45°C.) being preferred to initiate the polymerization. Slightly lower temperatures, down to 0°C., are permissible. After most of the monomers have been converted to polymer, temperatures even higher than 95°C. may be employed. During polymerization, the temperature can be controlled in part by the rate at which monomers are supplied and polymerized and/or by applied cooling.

The polymerization process can be carried out batchwise or continuously. It is possible to work entirely batchwise emulsifying the entire portion of monomers and proceeding with polymerization. It is usually advantageous, however, to start with part of the monomers to be polymerized and add more monomer or monomers as polymerization proceeds. Gradual or incremental addition of monomer (either continuous or periodic) is advantageous in reaching a high solids content with optimum control of reaction conditions. Gradual or incremental addition of ethylenically unsaturated sulfur acid is particularly advantageous since this promotes the formation of additional micells facilitating the formation of a polydisperse emulsion polymer. Catalyst or components of the redox system catalyst may be added as the polymerization proceeds and these can be used to control the speed of reaction to avoid over heating. In those cases where gradual or delayed addition of monomer is employed, it is also desirable to use part or all of the emulsifier to emulsify the monomers prior to the addition to the polymerization zone and/or to form a seed latex. Initiation of the polymerization reaction in the presence of seed latex is advantageous since it reduces the polymerization induction period and lessens and tendency of a latex to coagulate in the initial stages.

In some cases, it may be desirable to add preformed latex polymer particles to the polymerization reaction after the reaction becomes exothermic in the manner described in U.S. Pat. No. 3,424,706. This method is particularly useful for forming polydisperse polyvinylidene chloride latexes when the polymerization reaction is carried out batchwise except for the addition of preformed latex polymer particles.

The preferred method of preparing the vinylidene chloride polymers of this invention comprises the steps of (1) initiating the polymerization of vinylidene chloride in the presence of preformed addition polymer in latex form having an average diameter less than the average diameter of the ultimate polydisperse polyvinylidene chloride polymer (0.01 to 0.12 micron), (2) adding additional monomer, preferably emulsified, at a predetermined rate and polymerizing said monomers and (3) terminating the polymerization at a predetermined solids content usually in the range of about 50 to 65 percent total solids.

The resultant vinylidene chloride latexes of this invention can be used to coat various substrates, such as unprimed polyolefins, primed polyolefins, aluminum foil, paper, glassine, etc.

The following examples are merely illustrative and should not be construed as limiting the scope of the invention.

In the examples to follow, peel strength of the polyolefin film-polyvinylidene chloride laminate was determined by coating the polyvinylidene chloride latex on polyolefin substrate using a wire wrapped rod. After the latex air dried to a film at room temperature, the polyvinylidene chloride side of the laminate was brought into face-to-face contact and heat sealed at 270°F. for one second at 40 psi using a Sentinel impise sealer. After standing at room temperature under ambient conditions or after aging at 100 percent relative humidity for 16 hours, the peel strength of the heat seal was determined on an Instron Tester.

EXAMPLE 1

The following premixtures were prepared to be used in the preparation of a polyvinylidene chloride latex:

| | Parts (wet weight) |
|---|---|
| Emulsifier-Monomer Premixture | |
| Vinylidene Chloride | 8,640 |
| Methyl Acrylate | 624 |
| Hydroxyethyl acrylate | 192 |
| Acrylic acid | 96 |
| Sodio 2-sulfoethyl methacrylate (8% dry solids) | 600 |
| Igepal CO-880 (20% dry solids) | 240 |
| Brij 35 (20% dry solids) | 120 |
| Sodium lauryl sulfate (20% dry solids) | 24 |
| $Na_2HPO_4$ (6% dry solids) | 96 |
| Water | 1,200 |
| Reactor Charge: | |
| $NaH_2PO_4 \cdot H_2O$ | 4.8 |
| Brij 35 (20% solids) (lauryloxypolyoxyethylene glycol) | 40 |
| 2% by weight $H_2O_2$ | 160 |
| Seed Latex (20% dry solids) | 240 |
| Water | 4,000 |
| Promoter: | |
| Ascorbic Acid | 9.6 |
| Water | 960 |
| Additional Catalyst: | |
| 2% by weight $H_2O_2$ | 400 |

A water cooled stainless steel reactor was charged with the above-described charge and 23.85 parts by weight of the emulsifier-monomer premixture. After the temperature was adjusted to 30°C., promoter was added to the reactor at a rate of 8.77 parts by weight per hour. After about 20 minutes, the addition of emulsifier-monomer premixture was started at the rate of about 35.79 parts per hour. The temperature was maintained at between 40° to 50°C. by coding and adjusting the rate of addition of emulsifier-monomer premixture, promoter and additional catalyst. After about 9 hours, the reaction temperature was raised to 70°C. to complete the polymerization.

The undiluted 55 percent solids polyvinylidene chloride latex having a surface tension of 58 dynes/cm. containing about 0.06 part by weight sodium lauryl sulfate per 100 parts by weight monomer was coated on corona discharge treated polypropylene (capable of being wetted with a solution having a surface tension of 43 dynes/cm.). The laminate had a dynamic peel strength of 220 grams per inch at ambient conditions and 130 grams per inch after aging at 100 percent relative humidity. Essentially the same results are obtained using unprimed polyethylene.

The seed latex used in this example was prepared by charging a water-cooled stainless steel reactor with 0.2 part by weight $NaH_2PO_4 \cdot H_2O$, 600 parts by weight water, 10 parts by weight 2% $H_2O_2$ and 40 parts by weight of an emulsifier composition composed of equal parts by weight of Igepal CO—880 (20 percent dry solids) and sodium lauryl sulfate (20 percent dry solids). Two hundred and eight parts by weight of an emulsifier monomer composition containing 177 parts by weight vinylidene chloride, 20 parts by weight methyl acrylate, 3 parts by weight acrylic acid, 25 parts by weight sodio 2-sulfoethyl methacrylate (8 percent solids), 10 parts by weight Igepal CO—880 (20 percent solids), 10 parts by weight sodium lauryl sulfate (20 percent solids) and 35 parts by weight water was added to the reactor at a rate of 1.3 parts per minute. At the same time, 30 parts by weight ascorbic acid (1 percent by weight dry solids) was added while maintaining the temperature at between 40° to 45°C. The seed latex was cooled, poststabilized with 10 parts by weight Igepal CO—880 (20 percent solids) and 10 parts by weight sodium lauryl sulfate (20 percent solids) and diluted with water to form a 20 percent solids composition.

EXAMPLE 2

The following premixtures were prepared to be used in the preparation of polyvinylidene chloride latexes:

| | Parts (wet weight) |
|---|---|
| Emulsifier Monomer Premixture | |
| Vinylidene chloride | 8,950 |
| Methyl acrylate | 700 |
| Hydroxyethyl acrylate | 175 |
| Acrylic acid | 175 |
| Igepal CO-880 (100% dry solids) | 125 |
| Igepal CO-850 (100% dry solids) | 35 |
| Sodium lauryl sulfate (29% dry solids) | 137.5 |
| Water | 2,370 |
| Reactor Charge: | |
| Sodium acetate·3 $H_2O$ | 20 |
| Citric acid | 1.5 |
| Seed latex (20% dry solids) | 375 |
| 1% by weight hydrogen peroxide | 333 |
| Water | 1,875 |
| Promoter: | |
| Ascorbic acid (0.8% by weight active) | 1,125 |
| Additional Catalyst: | |
| 1% by weight hydrogen peroxide | 417 |

The monomer mixtures were polymerized in the manner described in Example 1 to yield a 60 percent by weight solids polyvinylidene chloride latex having a surface tension of 48.8 dynes/cm. suitable for use as a laminating adhesive for paper and aluminum foil.

The seed latex used in this example was prepared by charging a water-cooled stainless steel reactor with 0.2 parts by weight $NaH_2PO_4 \cdot H_2O$, 640 parts by weight water, 20 parts by weight 2 percent $H_2O_2$ and 60 parts by weight of an emulsifier composition composed of 56.0 parts by weight of sodium dodecylbenzenesulfonate (23 percent dry solids), 5.5 parts by weight sodium lauryl sulfate (29 percent dry solids), 3.5 parts by weight disodium mondecylphenoxybenzenedisulfonate (45 percent dry solids) and 15 parts by weight water. After the temperature was adjusted to 35°C., 280 parts by weight of an emulsifier monomer composition containing 180 parts by weight vinylidene chloride, 18 parts by weight methyl acrylate, 2 parts by weight methacrylic acid and the remaining 20 parts by weight of the above-described emulsifier composition was added to the reactor at the rate of about 3 parts by weight per minute. At the same time 40 parts by weight of ascorbic acid (0.8 percent by weight dry solids) was added over a period of about 2 hours while maintaining the reactor at between 35° to 45°C.

EXAMPLE 3

This example illustrates the use of 2-hydroxypropyl methacrylate as an internal wetting agent. Example 1 was repeated except that 192 parts by weight of 2-hydroxypropyl methacrylate was used in place of the 192 parts by weight of hydroxyethyl acrylate. The undiluted 55 percent solids polyvinylidene chloride latex having a surface tension of 58 dynes/cm. was coated on corona discharge treated polypropylene. The laminate had a dynamic peel strength of 300 grams/inch at ambient conditions and 110 grams/inch after aging at 100 percent relative humidity.

EXAMPLE 4

This example illustrates the preparation of a polyvinylidene chloride latex suitable for coating corona discharge treated polypropylene, which requires a solution having a surface tension of less than 27 dynes/cm. to wet the polypropylene surface. The following premixtures were prepared:

| | Parts (Wet Weight) |
|---|---|
| Emulsifier-Monomer Premixture | |
| Vinylidene chloride | 80 |
| Methyl acrylate | 9 |
| Hydroxyethyl acrylate | 10 |
| Sodio 2-sulfoethyl methacrylate (10% dry solids) | 10 |
| Triton X-705 (20% dry solids) (Octylphenoxypolyoxyethylene glycol) | 0.5 |
| Aerosol A-196 (20% dry solids) | 1.5 |
| 1% FC 170 (fluorocarbon leveling agent) | 1 |
| Water | 10 |
| Reactor Charge: | |
| NaH$_2$PO$_4$·H$_2$O | 0.1 |
| Sodio 2-sulfoethyl methacrylate (10% dry solids) | 5 |
| Ammonium persulfate | 0.2 |
| 2% H$_2$O$_2$ | 5 |
| Water | 50 |
| Promoter: | |
| Ascorbic acid (1% dry solids) | 25 |

A water cooled glass reactor was charged with the above-described charge and 25 parts by weight of the emulsifier-monomer premixture. After the temperature was adjusted to 35°C., promoter and emulsifier-monomer premixture were added at a rate to maintain the temperature at between 47° to 50°C. After all of monomer-premixture was added, the reaction temperature was raised to 65°C. to complete the polymerization.

The undiluted 55 percent solids polyvinylidene chloride latex having a surface tension of about 59 to 60 dynes/cm. was coated on corona discharge treated polypropylene (capable of being wetted with a solution having a surface tension of 27 dynes/cm.). The polyvinylidene chloride laminate was heat sealed at 260°F. for one second at 20 psi. The laminate had a dynamic peel strength of 260 grams per inch after aging at ambient conditions and 210 grams per inch after aging at 100 percent relative humidity. The laminate had an oxygen permeability of 2 cc/100 sq. inch/atm/day. Essentially the same results are obtained using unprimed polyethylene.

EXAMPLE 5

Example 4 was repeated except that the vinylidene chloride concentration was increased to 85parts by weight and the methyl acrylate concentration was decreased to 4 parts by weight. The undiluted 55 percent solids polyvinylidene chloride latex having a surface tension of about 59 to 60 dynes/cm. was coated on corona discharge treated polypropylene of the type employed in Example 4 and heat sealed at 260°F. for one second at 20 psi. The laminate had a dynamic peel strength of 210 grams per inch at ambient conditions and 160 grams per inch after aging at 100 percent relative humidity. The laminate had an oxygen permeability of 0.5 cc/100 sq. inch/atm/day.

Since many embodiments of this invention may be made and since many changes may be made in the embodiments described, the foregoing is to be interpreted as illustrative only, and our invention is defined by the claim appended hereinafter.

What is claimed is:

1. A coated substrate comprising a vinylidene chloride copolymer coating bonded to a substrate, said vinylidene chloride copolymer coating comprising a copolymer of: (A) 70 to 95 percent by weight of vinylidene chloride, (B) 0.5 to 30 percent by weight of a hydroxyalkyl ester of an alpha, betaethylenically unsaturated carboxylic acid, (C) 0.3 to 3 percent by weight of a sulfoalkyl ester of an alpha, beta-ethylenically unsaturated acid, (D) 0 to 5 percent by weight of ethylenically unsaturated carboxylic acid and (E) up to 29.5 percent by weight of ethylenically unsaturated monomer containing no free acid or hydroxyalkyl groups and other than (A), (B), (C) or (D) to prevent premature crystallization of the copolymer prior to application and to impart flexibility and heat-sealing properties to the copolymer coating, said copolymer containing at least 2 percent by weight in total of said monomers (B) and (E) to prevent premature crystallization of the copolymer.

2. The coated substrate of claim 1 wherein said copolymer is bonded to a polyolefin substrate surface and said polyvinylidene chloride polymer comprises (A) 80 to 95 percent by weight of vinylidene chloride, (B) 0.5 to 18 percent by weight of said hydroxyalkyl ester, (C) 0.3 to 1.5 percent by weight of said sulfoalkyl ester, (D) 0 to 2 percent by weight of said ethylenically unsaturated carboxylic acid and (E) up to 29.5 percent by weight of said ehtylenically unsaturated monomer, said copolymer containing at least 4 percent by weight in total of said monomers (B) and (E).

3. The coated substrate of claim 2 wherein said polyolefin is polyethylene.

4. The coated substrate of claim 2 wherein said polyolefin is polypropylene. claims 5. A process for forming a polyolefin coated substrate having a dry vinylidene chloride copolymer coating which comprises coating a vinylidene chloride copolymer latex onto an unprimed polyolefin substrate, said latex consisting essentially of a copolymer of (A) 80 to 95 percent by weight of vinylidene chloride, (B) 0.5 to 30 percent by weight of a hydroxyalkyl ester of an alpha, beta-ethylenically unsaturated carboxylic acid, (C) 0.3 to 3 percent by weight of a sulfoalkyl ester of an alpha, beta-ethylenically unsaturated acid (D) 0 to 5 percent by weight of an ethylenically unsaturated carboxylic acid, and (E) up to 29.5 percent by weight of an ethylenically unsaturated monomer containing no free acid or hydroxyalkyl groups and other than (A), (B), (C) or (D) to prevent premature crystallization of the copolymer prior to application and to impart flexibility and heat-sealing properties to the dried copolymer, said copolymer containing at least 2 percent by weight in total of said monomer (B) and (E) to prevent premature crystallization of the copolymer, and drying the vinylidene chloride copolymer latex coating to provide a coated unprimed polyolefin substrate having a dry coating of said vinylidene chloride copolymer.

6. The process according to claim 5 wherein the coating comprises (A) 80 to 95 percent by weight of vinylidene chloride, (B) 0.5 to 18 percent by weight of said hydroxyalkyl ester, (C) 0.3 to 3.0 percent by weight of said sulfoalkyl ester, (D) 0 to 5 percent by weight of said ethylenically unsaturated caboxylic acid, and (E) up to 29.5 percent by weight of said ethylenically unsaturated monomer, said copolymer containing at least 4 percent by weight in total of said monomers (B) and (E).

7. The process according to claim 6 which includes the additional step of laminating together vinylidene chloride copolymer coated substrates by superposing the dry vinylidene chloride copolymer coatings in a face-to-face relationship and laminating the superposed substrates by heat-sealing means sufficient to provide a vinylidene chloride copolymerpolyolefin laminate having a dynamic peel strength of at least 100 grams per inch after aging for 16 hours under ambient conditions and 100 percent relative humidity.

8. The process according to claim 7 wherein the unprimed polyolefin substrate employed consists essentially of at least one polyolefin substrate selected from the group consisting of polypropylene and polyethylene.

9. The process according to claim 8 wherein the dynamic peel strength of the laminate is at least 160 grams per inch at 100 percent relative humidity and at least 210 grams per inch at ambient conditions.

10. The process according to claim 9 wherein said vinylidene copolymer contains from 0.3 to 1.5 percent by weight sodio 2-sulfoethylacrylate, between 0.5 to 18 percent by weight of at least one hydroxyalkyl ester selected from the group consisting of hydroxyethyl acrylate and 2-hydroxypropyl methacrylate, 0 to 2 percent by weight of an ethylenically unsaturated carboxylic acid selected from the group of acrylic acid and methacrylic acid, and from about 0.001 to 0.6 parts by weight of a non-polymerizable anionic emulsifier per 100 parts by weight of vinylidene copolymer.

11. The process according to claim 10 wherein the hydroxyalkyl ester consists essentially of hydroxyethyl acrylate and the ethylenically unsaturated monomer consists essentially of methyl acrylate.

* * * * *

UNITED STATES PATENT OFFICE
CERTIFICATE OF CORRECTION

PATENT NO. : 3,850,726

DATED : Nov. 26, 1974

INVENTOR(S) : David R. Smith; Howard Peterson

It is certified that error appears in the above-identified patent and that said Letters Patent are hereby corrected as shown below:

Column 1, bridging lines 63/64, for "in the 1,011,500 patent" read ---in British Patent 1,011,500---
Column 1, line 65, for "in the 1,011,500 patent" read ---in British Patent 1,011,500---
Column 2, line 24, for "oxygenimpermeability" read "oxygen-impermeability---
Column 2, line 25, for "tend not to wet" read ---tend to inadequately wet---
Column 2, line 26, for "films, particularly" read ---films and particularly---
Column 2, bridging lines 27/28, for "polypropylene, adequately and coatings deposited therefrom suffer" read ---polypropylene films. These inadequately wetted coatings suffer---
Column 2, line 54, for "chloridepolyolefin" read ---chloride-polyolefin---
Column 3, line 66, for "internal wetting" read ---internal,copolymerized wetting
Column 5, line 36, for "0.2%" read ---0.2 to 2%---
Column 6, line 55, for "monionic" read ---nonionic---
Column 7, bridging lines 35/36, for "freeradical" read ---free-radical---
Column 7, line 37, for "atom or each" read ---atom on each---
Column 8, line 26, for "batchwise emulsifying" read ---batchwise by emulsifying---
Column 8, line 48, for "and" read ---any---
Column 9, line 17, for "impise" read ---impulse---
Column 9, line 59, for "coding" read ---cooling---
Column 11, line 12, for "was" read ---were---
Column 12, line 32, for "claim" read ---claims---
Column 12, line 45, for "groups and other" read ---groups other---
Column 12, line 62, for "ehtylenically" read ---ethylenically---
Column 12, line 68, for "polypropylene. claims" read ---polypropylene ---
Column 13, line 14, for "groups and other" read ---groups other---
Column 13, line 29, for "unsaturated carboxylic" read ---unsaturated carboxylic---
Column 14, line 20, for "vinylidene copolymer" read ---vinylidene chloride copolymer---
Column 14, line 29, for "vinylidene copolymer" read ---vinylidene chloride copolymer---

Signed and Sealed this seventh Day of October 1975

[SEAL]

Attest:

RUTH C. MASON
Attesting Officer

C. MARSHALL DANN
Commissioner of Patents and Trademarks